Aug. 25, 1931.　　　E. A. SAUNDERS　　　1,820,327
FASTENER
Filed June 24, 1926
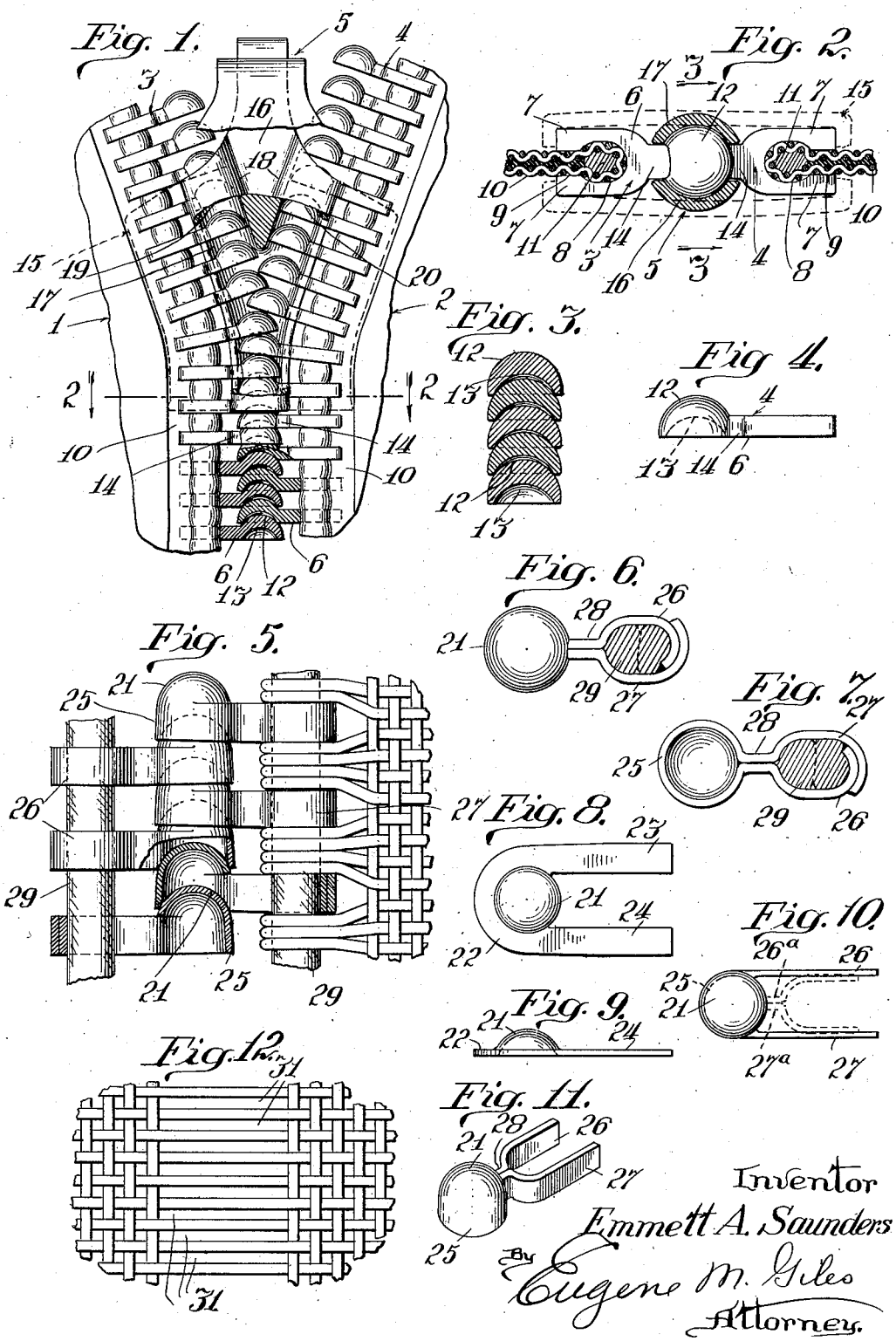
Inventor
Emmett A. Saunders
By Eugene M. Giles
Attorney.

Patented Aug. 25, 1931

1,820,327

UNITED STATES PATENT OFFICE

EMMETT A. SAUNDERS, OF SOUTH BEND, INDIANA, ASSIGNOR TO MISHAWAKA RUBBER AND WOOLEN MANUFACTURING COMPANY, OF MISHAWAKA, INDIANA, A CORPORATION OF INDIANA

FASTENER

Application filed June 24, 1926. Serial No. 118,151.

My invention relates to fastening devices of the type wherein each of two parts of fabric or the like which are to be connected has a series of fastener elements on the edge thereof and the fastener elements are adapted to be interlocked and released by movement of a cam member or slider along the two series of elements.

In fastening devices of this character, the so called ball and socket type such as shown in my co-pending application Serial No. 37,027, having headed members cooperating with socket members, has the advantage that the balls or heads afford bearing faces of the proper form for flexibility, while the neck portions avoid any lateral expanse that might occasion binding and cramping of the adjoining elements when the interlocked fastener is flexed or doubled over. However, it is desirable to use elements that are the same on both sides of the gap or opening, as it simplifies the manufacture of the fastener and avoids the difficulty and confusion in handling several kinds of elements, and this is accomplished in my present structure by, in effect, cutting an element with a hollow ball longitudinally into two parts so that each has a half ball end and using the same kind of half ball elements on both sides.

The principal objects of my invention are to provide a fastener having the above noted advantages of the ball and socket type and using elements that are alike on both sides; to accomplish this result by using half-ball elements; to form the interlocking portion as substantially one-half of a hollow ball so that the convex side of each element engages in the concave side of a fastener element of the opposed series; to retain the necked construction of the so called ball and socket type and thereby permit free rocking action of the adjoining interlocked elements without cramping and binding; to minimize the width of the cam member or slider; to provide an element of a form that may be readily produced from sheet metal; to provide a new form of mounting; and in general, to provide a fastener of simple and improved form which may be easily and conveniently manufactured and having the characteristics which are desired in fasteners of the slider operated type.

On the drawings:

Fig. 1 is a front fragmentary view of a fastening device embodying my improvements, with portions of the operating member or slider broken away to show the manner of interlocking and releasing;

Fig. 2 is an enlarged sectional view taken on the line 2—2 of Fig. 1;

Fig. 3 is a sectional view of the elements of Fig. 2 on the line 3—3;

Fig. 4 is a side view of one of the elements;

Fig 5 is an enlarged fragmentary view of a modified form of the fastener;

Figs. 6 and 7 are top and bottom views respectively of an element of a modified form showing in section the cord or stringer on which they are mounted;

Fig. 8 is a plan view and Fig. 9 is an edge view of the blank from which the elements of Figs. 5, 6 and 7 are formed;

Fig. 10 is a top view of the blank shaped in the preliminary form;

Fig. 11 is a top perspective view of the element in the final form preparatory to mounting; and Fig. 12 is a fragmentary view of a portion of the tape or fabric to which the elements are secured.

Referring to the drawings and particularly Figs. 1 to 4 inclusive, the reference numerals 1 and 2 indicate fragmentary portions of the parts which are to be connected and 3 and 4 the fastener elements which are mounted respectively on the edges of the parts 1 and 2 and interlocked and released in the usual manner by a cam member or slider 5 which is movable along the two opposed series of fastener elements 3 and 4 for this purpose. The fastener elements 3 and 4 are alike and each comprises an elongated substantially flat member 6 with mounting means at one end and interlocking means at the other end, the former being of any suitable form as for example, a pair of jaws 7 which are formed by providing the member 6 with an aperture 8 and a slot 9 leading outwardly from the aperture. In practice it is customary to assemble the elements on a tape or stringer which is in turn secured to the parts 1 and 2 that are to be connected, a tape of such character being indicated herein at 10 and provided as in the usual manner with an enlarged or corded edge 11, around which the jaws 7 are clamped so that the enlarged or corded edge 11 occupies the aperture 8 of the element with the tape portion extending outwardly through the slot 9.

The interlocking portions of the elements 6 is in substantially the form of one-half of a hollow sphere having the convex face 12 and the concave face 13, which said faces are arranged so that in the interlocking operation of fastener, the convex side 12 of the element engages in a recess 13 of an element of the opposed series, while the recess 13 forms a seat for the convex side 12 of an element of such opposed series, thereby affording an interlocking engagement between the elements of the two series which effectively prevents direct separation of the interlocked elements.

The semi-spherical form of the convex side 12 of the element affords a bearing surface of the proper form to permit relative angular adjustment of adjoining interlocked elements which flexibility is further promoted by reducing the portion of the member 6 immediately behind the interlocking half ball 12—13 to form a neck 14. With this construction the extreme end of the fastener element which rests or is positioned over the neck 14 can tilt laterally with entire freedom at either side of the neck portion 14 without any cramping or binding which is occasioned when the element is of uniform width from end to end or has a wide flat surface immediately behind the interlocking portion of the element. With this construction each half ball is free to rock or slide laterally on the concave face 12 of the adjoining element with which it is interlocked and extreme flexibility of the interlocked fastener is obtained and at the same time the engagement of the convex side 12 with the concave side 13 of the adjoining element is such that the elements are held securely interlocked against slipping sidewise out of engagement when the interlocked fastener is flexed or doubled over.

With fastener elements of the character above described, a slider as indicated by dotted lines at 15 may be used which engages the ends of the jaws 7 for bringing the opposed elements into the interlocking position, but in view of the head and neck constructon of the elements on both sides, I prefer to use a slider 5 which merely engages the headed portions of the elements with the edges of the slider turned in to embrace the neck portions 14. This slider comprises front and rear plates 16 and 17 respectively which may be indented as indicated and secured together at 18 or otherwise constructed, as for example, by casting in a single piece and shaping to afford a wedge shaped spreader portion between convergent substantially rounded channels 19 and 20 which merge into a single channel at the lower end of the slider such as shown in cross section in Fig. 2, said divergent channels and the single channel into which they merge being suitably rounded to embrace the headed portions 12 of the fastener elements and having slots at the outer sides through which the neck portions 14 of the elements project. With this construction, as the slider is moved in one direction, the elements 3 and 4 at opposite sides of the gap are fed through the divergent channels 19 and 20 into the common channel at the lower end of the slider, said elements by reason of the angular arrangement of the divergent channels, being fanned out or spread apart at their locking ends as they are brought into interengagement so that the semi-spherical recessed heads on each side are slipped over the rounded faces 12 of the elements on the opposite side and when the elements at opposite sides of the gap are straightened up in substantially parallel relation, the elements on the one side are interlocked with those on the other side so that they cannot be separated except by movement of the slider therealong in the reverse direction. It will be understood that as the slider is moved in such reverse direction, the interlocked elements pass into the common channel of the slider and the elements are thereafter spread apart by the divergent channels 19 and 20 and the spreader portion of the slider between said channels so that the elements on one side are released from engagement with the elements on the other side.

The elements 6 such as shown in Figs. 1 to 4 inclusive, are preferably stamped out of a metal blank of approximately the thickness of the flat portion of the element and have the interlocking portions 12—13 shaped by stamping. An element of this character may however, be conveniently made of sheet metal as indicated in Figs. 5 to 12 inclusive, wherein a blank of sheet metal is stamped in the form shown in Figs. 8 and 9 with a rounded end portion having a rounded projection or boss 21 of undivided substantially semi-spherical form struck up therefrom and a flat edge 22 part way around the projection 21 and terminating in a pair of arms 23 and 24 projecting laterally from the projection 21. The blank thus formed as shown in Figs. 8 and 9 is then stamped in the form shown in Fig. 10, the edge portion 22 being bent downwardly to form a depending flange 25 around the periphery of the projection or boss 21 and the arms 23 and 24 being likewise bent down as at 26 and 27 so as to form a continuation of the flange 25 which extends substantially half way around the projection 21 and terminates in the arms 26 and 27 which are now arranged with their flat sides in parallel relation and thereafter the arms 26 and 27 are indented adjacent the projection 21 as indicated by dotted lines at 26ª and 27ª in Fig. 10, so as to afford substantially a neck portion 28 for the element.

For mounting these elements they are preferably arranged in proper spaced relation along a cord or stringer 29 with the arms 26 and 27 straddling the cord or stringer 29, whereupon the arms 26 and 27 are folded or wrapped around the cord or stringer 29 as shown in Figs. 6 and 7 and the elements thereby clamped in spaced relation on the cord or stringer. With this construction the depending flange 25 and arms 26 and 27 with their indentations 28 have a substantially figure 8 form as shown in Fig. 7 with one loop of the figure 8 formation engaged around the stringer 29 and the other loop of the figure 8 formation extending around the edge of the projection 21, which latter extends entirely across the element. The stringer or cord 29 may be of oval cross section or other out of round form, two cords may be arranged side by side as indicated by dotted lines in Figs. 6 and 7, or the single cord may be compressed in form by the arms 26 and 27 as shown in Figs. 6 and 7, to hold the elements against relative turning movement in the cord or stringer. A fabric tape such as shown in Fig. 12, with a number of longitudinal threads drawn or omitted midway between the lateral edges thereof or otherwise constructed to afford intermediate openings or spaces 31, is then provided and the projecting ends of the elements on the cord 29 inserted through apertures or spaces 31 of the tape, and the latter is then folded around the cord or stringer 29 with the side portions of the tape gummed together and to the cord 29 or secured together in other suitable manner to hold the fastener elements and the cord or tape 29 in the folded edge thereof.

The slider for use in connection with the fastener element of the type last described may be of the same form as that shown in Figs. 1 and 2 as the indentations at opposite sides of the fastener elements afford rounded heads of the same character as those shown in Figs. 1 to 4 inclusive, which may be brought together and interlocked and separated and released in the same manner as the fastener elements of Figs. 1 to 4. With this construction the interlocking of the elements is accomplished in the same manner by the engagement of the recess side of the element with the rounded projection 21 which interlocks the elements against separation and permits freedom of lateral tilting with a corresponding high degree of flexibility which is aided by the neck formation 28 which permits lateral tilting of the interlocked elements without clamping or binding.

From the foregoing it will be observed that I have provided a fastener element of simple form involving the characteristics of ease of interlocking and releasing and extreme flexibility which is obtained in fasteners of the ball and socket type and I have at the same time avoided the undesirable feature of using elements of different forms on opposite sides of the gap as in the ball and socket type of fastener. Furthermore, an element of this character can be conveniently manufactured by cutting and stamping a metal blank of the thickness of the element or by bending a sheet metal blank into the desired form. Moreover, I have provided a convenient manner of attaching fastener elements, particularly of the sheet metal form, to the stringer or tape in a manner which affords a secure connection and permits shaping of the mounting portion of the elements in such a manner as to hold the element in alignment on the cord or stringer.

While I have shown and described my invention in a preferred form, I am aware that various changes and modifications may be made without departing from the principles of my invention, the scope of which is to be determined by the appended claims.

I claim as my invention:

1. A fastener element for a fastening device of the class described, said element comprising a substantially semi-spherical head extending entirely across the element and having a recess in the flat side, a neck extending from the periphery of the head and mounting means at the end of the neck.

2. A fastener element for a fastening device of the class described, said element comprising a substantially flat member of reduced width forming a neck intermediate of its ends and provided with mounting means at one end of the reduced neck and a head of substantially hollow undivided semi-spherical formation extending entirely across the element at the other end of the neck.

3. A fastener element for a fastening device of the class described, said element comprising a substantially hollow undivided semi-spherical portion extending entirely across the element, and a neck extending radially from the periphery of said semi-spherical portion and terminating in mounting means.

4. A fastener element for a fastening device of the class described, said element comprising a pair of spaced flat sheet metal arms joined together at one end and indented intermediate of the ends to afford a reduced neck portion, an integral undivided cup-shaped member on the connected ends of said arms and a stringer engaged between the other ends of the arms.

5. A fastener element for a fastening device of the class described, said element comprising a rounded undivided sheet metal boss having a flange bent downwardly from the peripheral edge thereof and said flange being extended to form a pair of lateral extensions to engage a stringer for mounting the element thereon.

6. A fastener element for a fastening device of the class described, said element comprising a flat strip of sheet metal with mounting and interlocking loop portions arranged in substantially figure-8 form and having an integral boss on the upper edge of the interlocking loop portion, and a stringer in the other loop portion.

7. In a fastening device of the class described, the combination of a stringer, a plurality of fastener elements having spaced arms engaging the stringer therebetween and said arms having overlapping extremities bent around the stringer to clamp the fastener elements on the stringer.

8. In a fastening device of the class described, the combination of a plurality of fastener elements each having a pair of laterally extending arms, a cord like stringer engaged between the arms and having the extremities of said arms overlapped and folded therearound.

9. In a fastening device of the class described, the combination of two parts having a series of fastener elements on the edges thereof, each of said fastener elements being provided with a projecting portion comprising a neck terminating in a substantially semi-spherical head extending entirely across the element and having a recess in the flat side, and a cam member having divergent channels meeting in a single channel and said channels engaging the heads of the fastener elements to slide along said series of fastener elements and interlock and release same.

10. A fastener stringer having locking members secured along the longitudinal edge thereof, each member comprising an interlocking portion and overlapping clamping jaws for securing same to the stringer.

EMMETT A. SAUNDERS.